United States Patent [19]
Lynch et al.

[11] Patent Number: 5,586,338
[45] Date of Patent: Dec. 17, 1996

[54] SYSTEM IDENTIFICATION (SID) LIST FOR SELECTING OPERATING FREQUENCIES

[75] Inventors: Richard Lynch, Yardley, Pa.; Robert T. Braun, Pittstown, N.J.; Michael Haberman, Morris Plains, N.J.; Edward J. Donofrio, Washington, N.J.; John G. Nightingale, Jr., Jamesburg, N.J.

[73] Assignee: Bell Atlantic Mobile Systems, Inc., Bedminster, N.J.

[21] Appl. No.: 362,297

[22] Filed: Dec. 22, 1994

[51] Int. Cl.⁶ .................... H04Q 7/00; H04Q 9/00
[52] U.S. Cl. ............. 455/34.1; 455/33.1; 455/54.1
[58] Field of Search ................. 455/33.1, 33.4, 455/34.2, 54.1, 54.2, 56.1, 62, 67.1, 67.7; 379/59, 61

[56] References Cited

U.S. PATENT DOCUMENTS

| | | | |
|---|---|---|---|
| 4,166,927 | 9/1979 | Hamaoki | 455/34.2 |
| 4,456,793 | 6/1984 | Baker et al. | 379/60 |
| 4,475,010 | 10/1984 | Huensch et al. | 455/56.1 |
| 4,513,415 | 4/1985 | Martinez | 455/56.1 |
| 4,718,081 | 1/1988 | Brenig | 455/33.3 |
| 4,742,560 | 5/1988 | Arai | 455/33.1 |
| 4,754,453 | 6/1988 | Eizenhofer | 455/33.2 |
| 4,850,033 | 7/1989 | Eizenhofer et al. | 455/56.1 |
| 4,903,320 | 2/1990 | Hanawa | 455/33.1 |
| 4,916,728 | 4/1990 | Blair | 379/59 |
| 5,046,082 | 9/1991 | Zicker et al. | 379/59 |
| 5,101,500 | 3/1992 | Marui | 455/56.1 |
| 5,101,501 | 3/1992 | Gilhousen et al. | 455/56.1 |
| 5,111,535 | 5/1992 | Tokunaga | 455/33.2 |
| 5,127,100 | 6/1992 | D'Amico et al. | 455/56.1 |
| 5,144,649 | 9/1992 | Zicker et al. | 379/59 |
| 5,150,362 | 9/1992 | Akerberg | 455/33.1 |
| 5,159,625 | 10/1992 | Zicker | 379/59 |
| 5,193,109 | 3/1993 | Chien-Yeh Lee | 379/59 |
| 5,212,822 | 5/1993 | Fukumine et al. | 455/33.1 |
| 5,239,675 | 8/1993 | Dudczak | 455/56.1 |
| 5,243,598 | 9/1993 | Lee | 455/33.1 |
| 5,247,564 | 9/1993 | Zicker | 379/59 |
| 5,261,117 | 11/1993 | Olson | 455/56.1 |
| 5,276,905 | 1/1994 | Hurst et al. | 455/62 |
| 5,285,494 | 2/1994 | Sprecher et al. | 379/59 |
| 5,289,527 | 2/1994 | Tiedemann, Jr. | 455/33.1 |
| 5,291,544 | 3/1994 | Hecker | 455/33.2 |
| 5,295,180 | 3/1994 | Vendetti et al. | 455/33.1 |
| 5,297,191 | 3/1994 | Gerszberg | 379/59 |
| 5,301,223 | 4/1994 | Amadon et al. | 379/59 |
| 5,303,289 | 4/1994 | Quinn | 455/33.2 |
| 5,313,653 | 5/1994 | Sasuta | 455/54.2 |
| 5,319,795 | 6/1994 | Hamabe et al. | 455/56.1 |
| 5,327,575 | 7/1994 | Menich et al. | 455/33.2 |
| 5,353,332 | 10/1994 | Raith et al. | 455/56.1 |

*Primary Examiner*—Reinhard J. Eisenzopf
*Assistant Examiner*—Marsha D. Banks-Harold
*Attorney, Agent, or Firm*—Lowe, Price, LeBlanc & Becker

[57] ABSTRACT

A cellular telephone system is upgraded by modifying subscriber units for selective service provider acquisition during roaming. Priority of acquisition is given to those service providers associated with the home service provider. These preferred service providers are identified by System Identification (SIDs) numbers. A roaming subscriber unit will tune to control frequencies to identify all of the system providers operating in a physical area to which the subscriber has roamed. The SIDs of those system providers available are compared to a list contained within the subscriber unit. Selection is made based upon a priority of those system providers having arrangements with the home system provider.

37 Claims, 5 Drawing Sheets

SYSTEM IDENTIFICATION (SID) LIST FOR SELECTING OPERATING FREQUENCIES

Technical Field

The present invention relates generally to subscriber cellular mobile radiotelephones (CMRs). More specifically, the present invention is related to methods for operating CMRs to automatically select preferred foreign cellular systems with which the CMRs can communicate.

BACKGROUND ART

Conventional cellular mobile radiotelephone subscriber units (CMRs) are capable of communicating on at least one of two independent sets of frequencies. However, a conventional cellular base system communicates on only one of these two sets of frequencies. Thus, a cellular base system may be referred to as an "A" system if it uses one set of frequencies or a "B" system if it uses the other set of frequencies. This dual-system approach to radiotelephony results from regulations which are intended, at least in part, to promote competition in providing radiotelephone services. When A and B cellular systems are both located in a single geographic area, radiotelephone service customers may choose to subscribe to either the A or B system in accordance with which system provides the best value to the customer. B systems are often referred to as "wireline" carriers because B systems are typically operated by the companies that provide wireline telecommunication services where the B systems are located. A systems are often referred to as non-wireline carriers because they are operated by companies other than the companies that operate the competing B systems. These frequency allocations are not necessarily permanent.

Each frequency set in a given cellular service area is assigned to one and only one service company. However, in different service areas the same frequency set may be assigned to different service companies (much as a television channel may be assigned to an affiliate of one network in one city and to an affiliate of another network in another city).

The home frequency set of a given telephone unit is the set of frequencies which the unit will ordinarily attempt to use. It will depend in large part on which service company is subscribed to by the telephone unit's user: if the user is a subscriber of a nonwireline service company, the user's home frequency set will be the A frequencies, and vice versa.

As will be familiar to those of ordinary skill, a frequency set typically includes paging channels and associated signalling channels, as well as voice channels. The paging and signalling channels are used for preliminary coded communications between a cellular telephone and a cell site in setting up a telephone call, after which a voice channel is assigned for the telephone's use on that call.

Each service company broadcasts a unique System Identification Number (SID) on all paging channels of the frequency sets on which it provides service in a given service area. A suitably equipped cellular telephone can thus determine which service company is providing service on a given paging channel by identifying the SID. Usually the SID contains three digits.

Receipt of a home SID is not necessarily required to be able to place a call. Many service companies have reciprocal billing arrangements with one another, meaning that a call can be placed on a frequency associated with a non-home cellular system. However, use of a non-home service company in this manner to place a call may result in the imposition of a surcharge (e.g., a fixed surcharge or a higher per-unit rate).

Furthermore, if the non-home service company does not have a reciprocal billing arrangement with the user's home service company, as a practical matter the user may not be able to place a call at all. Even though the telephone unit is capable of establishing a connection via the carrier signal, the non-home service company's switching equipment typically will not allow the user to do anything with the connection without a way to bill the user for his or her usage. Some service companies automatically switch calls of this kind to an operator who can take down a credit card number. However, absent a billing arrangement of some kind, no call can be completed.

Cellular telephones typically include status indication displays such as status lights. The "roam" light indicates that the telephone has detected a non-home SID on a carrier signal and can make at least a connection with that company's service via the carrier signal. The "no-service" light indicates that no cellular connections are available.

When a customer subscribes to a cellular system (either an A or B system), that system becomes the subscriber/customer's home system. The company that operates a customer's home system collects billing information and bills the customer for the customer's use of the home system's radiotelephone services. Whenever a customer is operating his or her CMR on a system other than the customer's home system, the customer is engaging in an activity known as roaming. The cellular system upon which a roaming CMR is operating is viewed as a foreign system.

Customers may receive telecommunication services while roaming. However, the home system company and the foreign system company must cooperate with one another before roaming services are permitted. For example, the foreign system must transfer call record information to the home system, and the home system must bill for, collect funds for, and distribute funds back to the foreign system for the roaming telecommunication services. Accordingly, the customer must typically pay additional charges when the customer uses roaming services.

When the customer operates his or her CMR in the area covered by the CMR's home system, no serious cellular base system selection choice needs to be made. The customer will almost always want to use the home system because the charges for home-system telecommunication services will be less. On the other hand, when the customer is roaming away from the home system, a choice of whether to operate a CMR on an A or B foreign system must be made.

Conventional CMRs employ any one of several different programmable selection processes in choosing a cellular system upon which to operate. For example, a CMR may prefer an A system but accept a B system if an A system is not available. This is called an A/B selection process. Conversely, a CMR may prefer a B system but accept an A system if a B system is not available. This is called a B/A selection process. Alternatively, a CMR may select only A systems (A-Only) or only B systems (B-Only) regardless of whether a competing system is available. Furthermore, a CMR may select only the home system so that roaming is prohibited. Other selection processes may be implemented as well. A CMR will typically utilize a default selection process which is consistent with its home system. For example, if a CMR's home system is an A system, then the CMR will typically utilize the A-Only or A/B selection processes as a default selection process.

Conventional CMRs permit alteration of the default selection process. However, this feature is not often used by customers because it is difficult to accomplish through a CMR's handset and because an intelligent nondefault selection process setting requires an understanding of cellular radiotelephony that many customers do not possess. Accordingly, providers of cellular services recognize that, for the most part, customers do not alter the default process selection setting.

The default selection process setting tends to limit any benefits that competition between A and B systems may provide while roaming. While the default setting favors the home system, at the same time it favors approximately one half of the numerous potential foreign systems over the other half of potential foreign systems. Assuming that this default setting does not change, in providing radiotelephone services to roaming customers one of each foreign area's two competing cellular systems benefits from an equipment-caused bias. As a result, the favored foreign systems need not aggressively price roaming services, and they need not be exceptionally cooperative with a roamer's home system, because it is highly probable that a roamer will use the favored foreign system regardless of cost. Consequently, roaming costs to a customer remain undesirably high.

While conventional CMRs can be configured so that the default system selection process setting is easily alterable, such configurations do not solve the problems faced by roaming customers. A typical customer is not prepared to make, or interested in making, a purchasing decision with respect to telecommunication services every time he or she is roaming. While roaming, a customer is unlikely to know the rates charged by the competing foreign cellular systems. Moreover, the rate structures may be complicated, and they may change from time to time. Thus, when a customer is roaming, he or she typically does not possess sufficient information upon which to base an intelligent foreign cellular system selection decision, even if the CMR has the capacity for such a selection. Typically the subscriber does not desire to go to the time and trouble to obtain this information, and mark the necessary alterations in the operation of the CMR.

DISCLOSURE OF THE INVENTION

An object of the present invention is to operate a CMR to select the most desirable foreign service provider with which to communicate.

Another object of the present invention is to prioritize cellular service providers with which the home service provider of a cellular subscriber has business arrangements.

It is a further object of the present invention to "weigh" operating parameters in the selection of foreign cellular service providers having contractual relationships with the home service provider roaming cellular subscriber.

It is yet a further object of the present invention to enhance competition in connection with telecommunication services provided to roaming cellular subscriber.

These and other objects of the present invention are achieved by a modified radio telephone subscriber unit. Each of these units is modified to contain a list of preferred system identification numbers (usually having special contractual relationships with the home service provider of each of the respective subscriber units). The subscriber units are programmed so that they will scan all the radio frequencies in all of the available frequency bands in the radio telephone communication system. The subscriber units will record at least one SID for each of the radio frequency bands (preferably the SID having the highest RSSI). Each of the radio telephone subscriber units contains means for comprising the received SIDs to a list of preferred SIDs stored in the subscriber unit. A single received SID based upon this comparison is generated by the subscriber unit and is used to acquire a radio frequency carrier corresponding to the system provider of the single selected received SID.

BEST MODE FOR CARRYING OUT THE INVENTION

Figure 1:
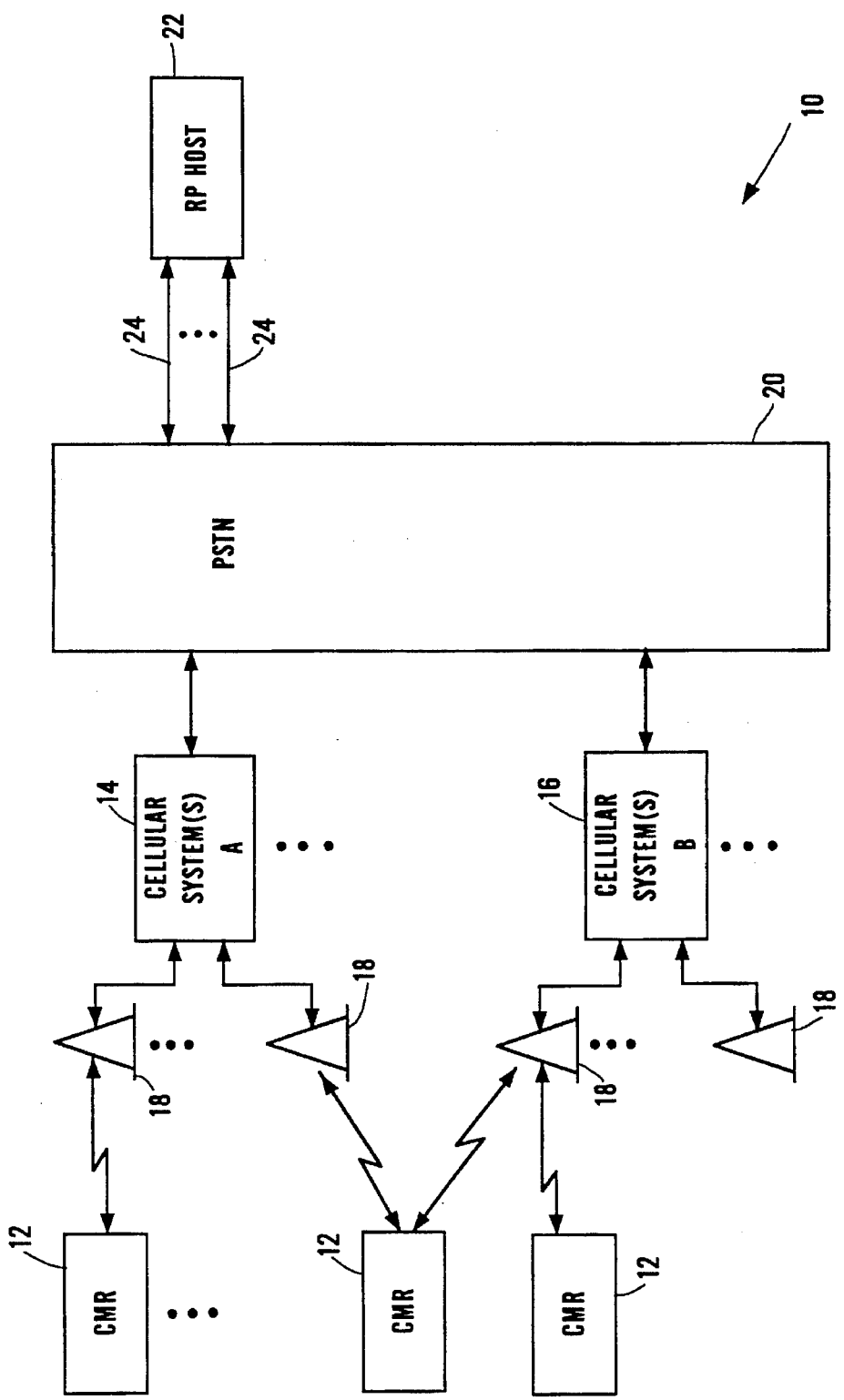
FIG. 1 is a block diagram of a cellular radiotelephone system constructed in accordance with the present invention.

FIG. 1 is a block diagram of a cellular radiotelephone system 10 within which the method of the present invention is practiced. System 10 includes a multiplicity of cellular mobile radiotelephone subscriber unit (CMRs) 12. The precise number of CMRs 12 is not a critical feature and may range from a few to many tens of thousands. As is conventional, each of CMRs 12 is capable of communicating with either an "A" type cellular system 14 or a "B" type cellular system 16. Those skilled in the art understand that A cellular systems communicate over a first set of predetermined frequencies while B cellular systems communicate over a second set of predetermined frequencies, the first and second sets being selected so that interference between the two sets is avoided.

Cellular systems 14 and 16 each include several spaced apart cells defined by antennas 18. Communication coverage over a geographic area is achieved through frequency channel manipulation between the cells. Moreover, both an A system 14 and a B system 16 may reside in a single geographic area. When a CMR 12 has subscribed to service at one of systems 14 and 16 in a single geographic area, that system is a home system for the CMR 12. The other of systems 14 and 16 in the home geographic area, and systems 14 and 16 located in all other geographic areas are foreign systems to the CMR 12. As is conventional, when CMR 12 is operating on a foreign system 14–16, CMR 12 is roaming.

All of A systems 14 and B systems 16, regardless of their designation as a home or foreign system, couple to and operate as an integral part of the public switched telecommunications network (PSTN) 20. PSTN 20 includes all the conventional cellular radio systems, cellular switching systems, trunks, satellites, and land-wired switching systems which are well known to those skilled in this art.

System 10 also includes a remote programming (RP) host 22, which couples to PSTN 20 through at least one, but preferably many, subscriber loops 24. RP host 22 is a computer system that remotely controls the programming of CMRs 12. Generally speaking, RP host 22 periodically engages in data communication sessions with CMRs 12.

During such sessions RP host 22 and a CMR 12 exchange data. Thus, data tables, timing data, predetermined telephone numbers, modes of operation flags, virtually any item of application data, and executable machine code utilized within CMR 12 may be altered as a result of such sessions. Specific details of a preferred implementation of remote programming host 22 and its relation to remotely accessible cellular radiotelephones are provided in the above-listed related patent references.

Figure 2:
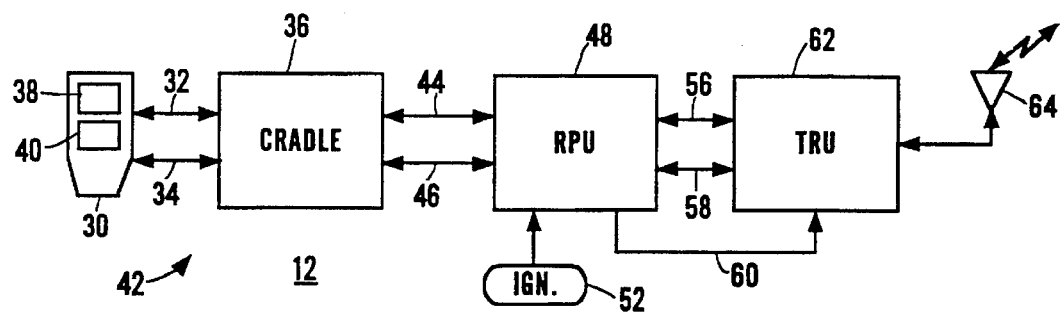
FIG. 2 is a block diagram of a cellular mobile radiotelephone (CMR) used in connection with the system of the present invention.

FIG. 2 is a block diagram of one example of a subscriber unit CMR 12 that can be used in connection with system 10. CMR 12 includes a handset 30 which is coupled through a first serial data bus 32 and a first audio bus 34 to a cradle 36. Handset 30 includes a display 38 and an array of keys 40. Together, handset 30 and cradle 36 are referred to as a control unit (CU) 42. CU 42 is a conventional control unit that performs functions which are well known in the art of cellular telephony.

A second serial data bus 44 and a second audio bus 46 interconnect cradle 36 with a remote programmable unit (RPU) 48. In addition, an ignition input 52 to RPU 48 couples to the ignition of an automobile (not shown) in which CMR 12 is installed. RPU 48 regenerates serial and audio busses 44 and 46 as serial data and audio busses 56 and 58, respectively. In addition, RPU 48 has a simulated ignition output 60. Busses 56 and 58, and output 60 couple to a conventional transmit-receive unit (TRU) 62. As is conventional, an antenna 64 through which TRU 62 communicates with antennae 18 (see FIG. 1) also couples to TRU 62. RPU 48 may represent a kit which is installed between a conventional CU 42 and a conventional TRU 62 of a conventional CMR. The use of conventional CMR equipment as a platform to which remote programmability hardware is added reduces costs due to the mass production of such conventional equipment. Preferably, RPU 48 is physically mounted on CU 42.

Figure 3:
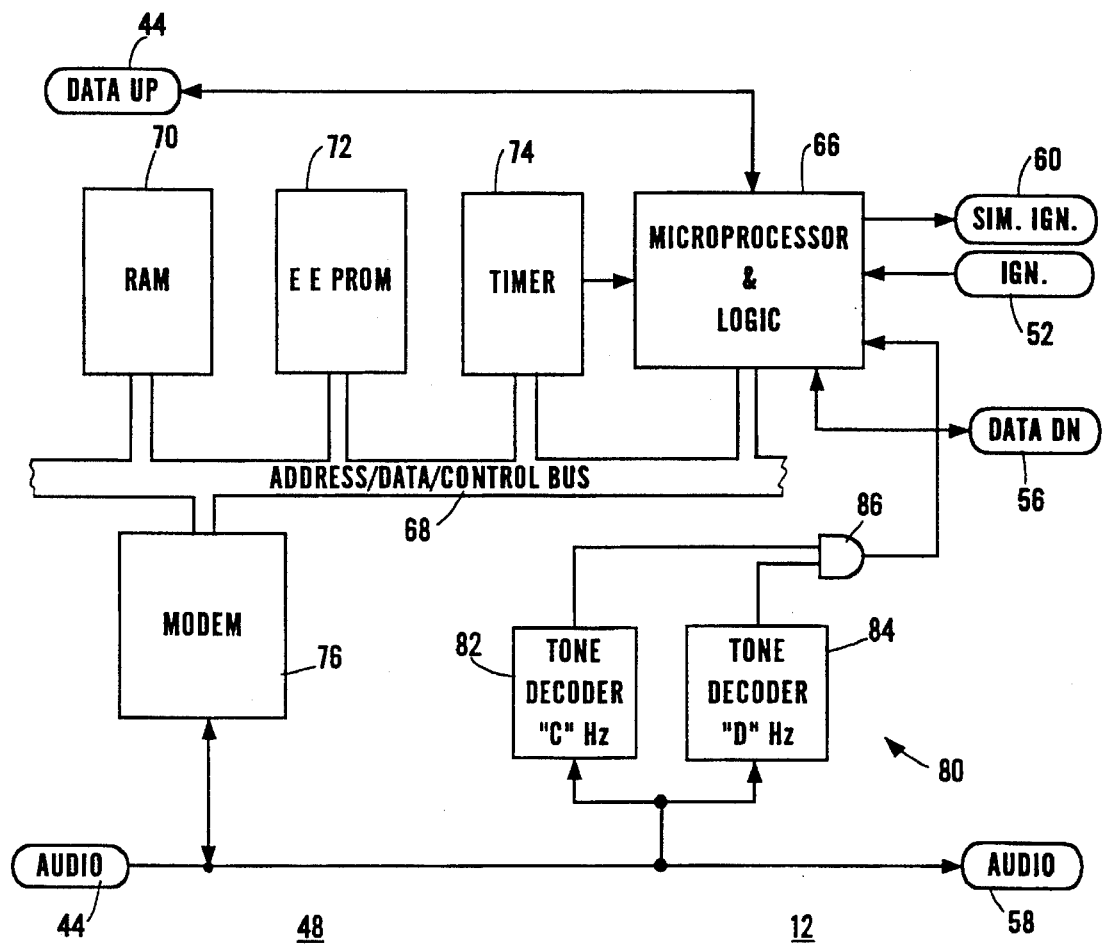
FIG. 3 is a block diagram of a remotely programmable unit (RPU) portion of the CMR of the present invention.

FIG. 3 is a block diagram of typical hardware included in an RPU 48 such as that depicted in FIG. 2. As shown in FIG. 3, a microprocessor and logic section 66 is coupled to serial data bus 44 and to an internal address/data/control bus 68. Through bus 68, section 66 communicates with a random access memory (RAM) 70, a non-volatile, read-write memory 72, such as an electrically erasable PROM (EEPROM), a timer 74, and a data port of a modem 76. Those skilled in the art will understand that RAM 70 is one example of a volatile read-write type of memory, and battery-backed-up RAM and other memory devices may serve as non-volatile read-write memory 72. An audio port of modem 76 is additionally coupled to audio bus 58, and timer 74 preferably is coupled to an interrupt input of section 66.

Microprocessor and logic section 66 generally control the operation of RPU 48. In conjunction with timer 74, section 66 maintains a clock and calendar. Moreover, power is continually supplied to section 66, timer 74, and supporting sections of RPU 48 so that data describing the date and time remain current even when ignition to a vehicle in which CMR 12 is installed is "off".

Modem 76 is a conventional modem circuit. Consequently, modem 76 recognizes audio signals on audio bus 58. Likewise, modem 76 supplies audio signals to audio bus 58. Modem 76 preferably operates at conventional data rates, such as 300, 1200, or 2400 bits per second, depending on control data supplied by microprocessor section 66. Communicated data and control data, such as carrier detection, are communicated to and from microprocessor section 66 through bus 68. On the other hand, ring detection is carried out by microprocessor section 66 monitoring data commands on serial data bus 56.

Section 66 senses the state of ignition signal 52. In addition, section 66 senses the state of an output from a signal detection circuit 80. Signal detection circuit 80 includes first and second tone decoders 82 and 84, respectively. Inputs of tone decoders 82 and 84 are coupled to audio bus 58, and outputs of tone decoders 82 and 84 are coupled to inputs of a logic element 86, which performs a logical AND function. The output of element 86 serves as the output of signal detection circuit 80 and is coupled to a sensing input of section 66.

Signal detection circuit 80 is configured to detect a predetermined login audio tone. In the preferred embodiment, this login tone includes two predetermined frequencies, labeled as "C" and "D" in FIG. 3. Frequencies C and D are selected so that the login tone is as unique as possible within normal telecommunication. In other words, the login tone is unlikely to be present during normal telecommunication operations, other than in a login procedure, an example of which is discussed in the above-listed related patents.

The method of the present invention is practiced, at least in part, by RPU 48. As discussed above, CU 42 and TRU 62 (see FIG. 2) are provided by conventional nonremotely programmable cellular radiotelephone equipment. Specifically, in the preferred embodiment, a cellular telephone manufactured by the OKI corporation as model EM-23 serves as CU 42 and TRU 62. Generally speaking, microprocessor and logic section 66 of RPU 48 practices this method by executing programming instructions stored in memories 70-72. This method involves, at least in part, the processing of data to control the operation of system 10 (see FIG. 1). Some of the specific processing tasks performed by the preferred embodiment are directly related to the data messages and data formats dictated by the above-mentioned OKI model EM-23 cellular telephone. However, other conventional cellular telephones have similar or identical types of data messages and can be adapted by those skilled in the art for use in connection with the present invention.

Another illustrative example of a microprocessor-based telephone system operated in accordance with the present invention is described below. This example uses an automobile cellular phone as an example, but it will be understood by those of ordinary skill that the invention can be implemented in virtually any telecommunications system.

Figure 4:
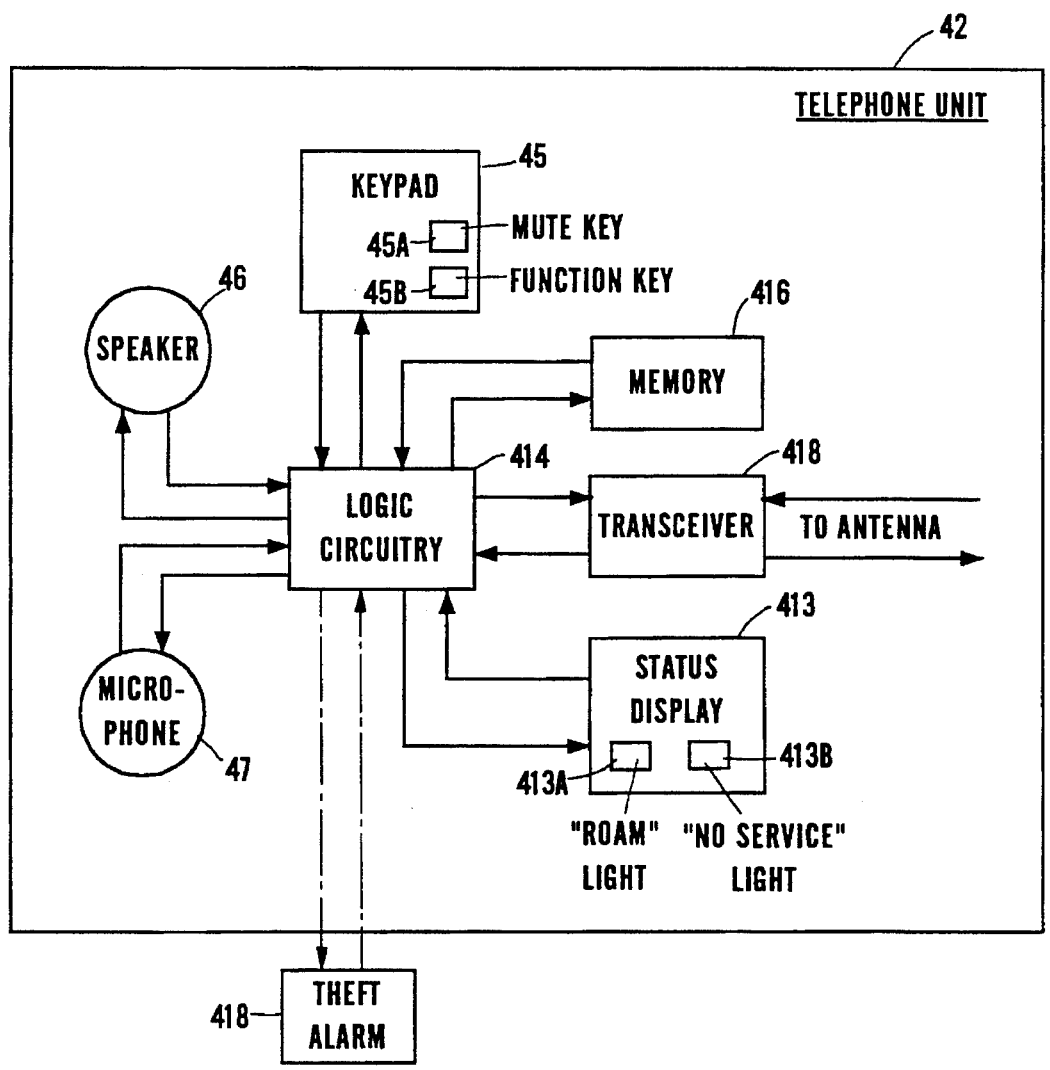
FIG. 4. depicts an alternative subscriber handset.

FIG. 4 depicts a typical automobile cellular telephone unit 42 having a unique mobile identification number (MID) stored in a suitable location such as an electrically erasable programmable read-only memory (EEPROM, not shown). Telephone units of this kind are well known in the art and are described here only in sufficient detail to aid understanding the invention.

The telephone unit 42 includes a handset 44 having a keypad 45; equivalently, the keypad 45 could be located separately from the handset. Also included in the telephone unit 42 are a speaker 46 and a microphone 47, shown as being mounted within the handset 44 but either or both of which could equivalently be mounted apart from the handset, either separately (e.g., in a telephone operator's headset or in wall mountings), or approximately together (e.g., in a walkie-talkie or speakerphone configuration).

A transceiver 418, ordinarily built into the telephone unit 42, exchanges signals via an antenna 410) with a Mobile Telecommunications Switching Office (MTSO) typically via radiotelephone signals relayed by one of several cell sites 11 that are in turn connected with the MTSO via a landline. The MTSO is ordinarily connected with a telephone company switching unit via a high-capacity landline or similar connection.

A status display 413 shows the status of the telephone unit 42. The status display 413 typically includes a NO SVC indicator to show that no cellular telephone service is available; and a ROAM indicator to show that the telephone unit 42 is outside its usual service area.

The transceiver 418 and antenna 410 are shown as being separate from the handset 44, but either or both could equivalently be built into the handset. The MTSO could equivalently be another telephone or similar unit if both telephones had appropriate signalling, switching, and call processing capabilities.

Those of ordinary skill having the benefit of this disclosure will appreciate that the signal exchange may utilize any of a wide variety of transmission systems that are equivalent for purposes of this description. These include, for example, radio, electrical-type wire (such as telephone landlines), modulation of light beams (e.g., in fiberoptic networks or laser beams), and so forth. The signal exchange may use one or more of these media alone or equivalently in combination. Whether specific components such as the antenna 410 are needed for a given implementation of the invention will depend in part on the transmission system selected for implementation.

The operation of the telephone unit 42 is controlled by logic circuitry 414. The logic circuitry 414 may be implemented in the form of a microprocessor which executes program statements stored in a storage device such as a read-only memory, or equivalently by discrete logic components or one or more custom semiconductor chips.

Those of ordinary skill will appreciate that a sequence of numbers to be dialed by the telephone unit 42 is processed by the logic circuitry 414 generally as follows, both in the prior art and in connection with the invention. Under control of the logic circuitry 414, the transceiver 418 transmits a cellular control signal to a cell site 411 over a signalling channel. The control signal includes a request that the MTSO dial a specified telephone number and assign a voice frequency or channel for use by the telephone unit 42.

The telephone unit 42 includes a read-write memory 416, accessible to the user and whose contents will not be affected by telephone power-downs of ordinary duration. For example, the memory 416 may equivalently comprise an EEPROM programmable by the user, a CMOS memory chip, or a conventional RAM with an independent power supply, any of which may possibly be implemented as part of a custom semiconductor chip.

It will be understood that telephones used in typical cellular systems are capable of generating both dual tone multi-frequency (DTMF) signals (DTMF signals produced by Bell telephones are referred to by the "Touch-Tone" trademark) and EIA standard IS-3-D cellular control signals.

Figure 5:
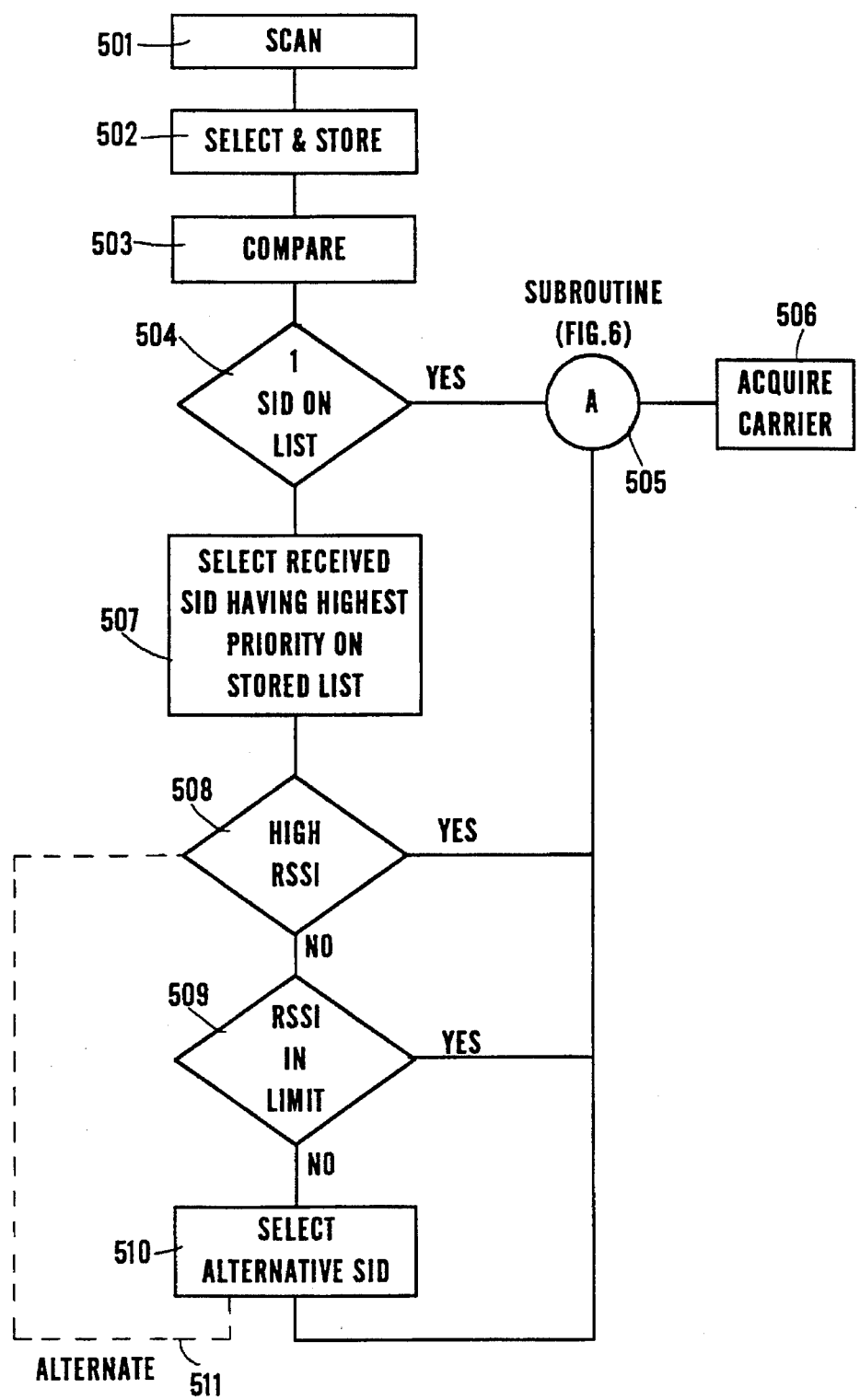
FIG. 5 is a flow chart depicting the operation of the present invention.
Figure 6:
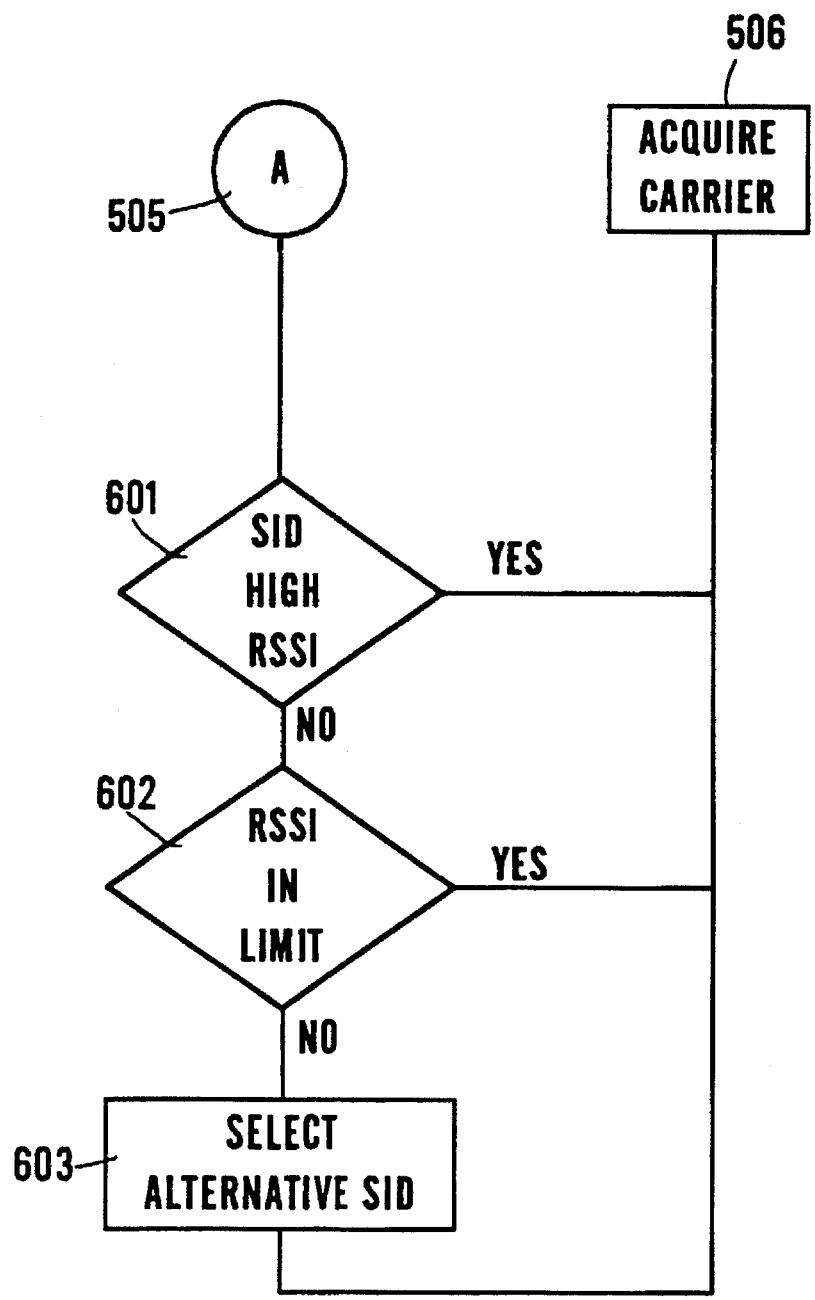
FIG. 6 is a flow chart depicting a sub-routine included in the operation of the present invention.

The present modified handset used to carry out the present invention can be programmed to handle both registration and hand-off in accordance with the operation depicted in FIGS. 5 and 6, or can be arranged to accommodate variations which would occur to those skilled in this art. It is noted that FIGS. 5 and 6 depict one example of an optimal, comprehensive system that it preferably applied in the registration operation of a roaming subscriber unit.

The present invention operates using the aforementioned modified handsets or any equivalent thereof in accordance with the process depicted in FIGS. 5 and 6. As previously stated, the SID is part of the overhead message that is sent to the mobile subscriber unit when it is powered up, and periodically thereafter. Normally when a mobile subscriber unit CMR is powered up, it scans the wireless systems operating within proximity to the mobile subscriber unit, taking signal strength readings in the various available frequency bands (cellular A and B, and PCS). This step is depicted at 501 in FIG. 5.

At step 502, at least one SID for each of the bands, as well as the corresponding Received Signal Strength Indication (RSSI) is stored at the subscriber unit. This function is preferably carried out in RAM 70 of FIG. 3 or in the logic circuitry 414 of FIG. 4. Normally only a single SID and its RSSI are recorded for each of the bands. However, on a third or C band that is normally dedicated to Personal Communication Systems (PCS), at least two SIDs and their RSSIs will be stored by the subscriber unit.

The present invention also encompasses the capability of selecting and storing more than one SID for each of the bands scanned. One example of such a situation is in areas at the interface between two service providers. Another example is found in hand-off situations. In both such situations, the two strongest signals for each of the scanned frequency bands will be selected and stored by the subscriber unit.

At step 503, the SIDs of the scanned signals having been selected and stored are compared with a list of SIDs for preferred system providers. Such system providers usually have a special contractual relationship with the home service provider of the roaming subscriber so that the subscriber receives preferential treatment, normally in the form of lower usage rates. The list is normally pre-programmed into either a special memory such as EEPROM 72 (FIG. 3) or a microprocessor and logic circuitry 414 (FIG. 4). However, storage of the preferred SID list corresponding to preferred service providers can be carried out in any manner that would occur to those having skill in this art. The preferred SID list can also be modified or updated in any practical manner that would occur to one skilled in this art. The comparison operation is a simple logic operation meant to identify the received SIDs corresponding to those on the preferred SID list stored in the subscriber unit CMR. This comparison can be as extensive as necessary depending upon the number of received SIDs and the full extent of the pre-stored preferred SID list.

At step 504, a determination is made as to whether one of the received SIDs is on the preferred SID list stored by the subscriber unit. If only a single received SID is found to be on the pre-stored preferred SID list, a determination of "YES" is made at step 504 and the process continues to point A at which sub-routine 505, as depicted in FIG. 6 can be carried out.

After sub-routine 505 is carried out, the subscriber unit acquires a carrier frequency corresponding to the single received SID as depicted at step 506. Once the carrier (on a control frequency) is acquired, the handset initiates registration with the system provider corresponding to the single SID resulting from the comparison of the received SIDs with a preferred SID list. It is noted that sub-routine 505 at point A is optional and can be used or deleted depending upon the constraints of the overall system as well as the priorities of the system operator.

There are other circumstances under which a plurality of positive comparisons will take place at step 503, resulting in a plurality of received SIDs from which a subscriber unit must choose. There are a number ways of making this choice. In the conventional art, usually the first received SID found in the first positive comparison is selected as the service provider with which the subscriber handset will register. This approach can be used with the present invention as long as each frequency band is scanned and at least one received SID from each band is stored in the subscriber unit.

The present system provides techniques that ensure greater chances of successful communication being carried out between the subscriber unit and the selected service provider. One such technique is the assignment of priority within the pre-stored preferred SID list in the subscriber's station. Such priority could be based upon contractual considerations. However, this is not necessary. Rather, priority can be based upon RSSI or other system characteristics of the service provider that might further enhance the quality of communication between the subscriber unit and the system provider, as well as enhance communication between parties in communication with the subscriber unit via the service provider. One criterion for such prioritization can be the selection of a particular band such as the PCS bands under certain conditions. However, other characteristics of particular service providers can also be the basis of such prioritization, as long as the result is communication superior to that of other service providers accessible by the subject subscriber unit. Whether the criterion for priority be contractual or characteristic of a communication system, one of the received SIDs is selected at step 507 to be that which is most preferred for registration with the subscriber unit.

At step 508, the RSSI of the selected SID having the highest priority is compared to the RSSI of each of the received SIDs having a positive comparison with the pre-stored SID list in the subscriber unit. If the selected SID has the highest RSSI of this group, the process moves to point A and the option of carrying out sub-routine 505. If the selected SID is unchanged by sub-routine 505, the control frequency corresponding to a service provider having the selected SID is acquired by the subscriber unit and registration carried out with that system provider.

If the selected SID does not have a highest RSSI of the received SIDs having a positive comparison with the pre-stored preferred SID list, a biasing process is conducted at step 509. The biasing process is used to favor a selected SID having a higher priority but a lower RSSI (or other signal characteristics) than other received SIDs found on the preferred SID list. One technique is indicated at step 509 and is constituted by a determination that the selected SID is within a predetermined tolerance "window". This "window" is based upon a predetermined difference between the RSSI of the selected SID and the highest RSSI of any received SID found on the priority list. Since the whole purpose of this comparison is to bias the system in favor of staying with a higher priority SID based on the preferred SID list, the size of the "window" or of any other threshold can be determined by well-known statistical techniques.

However, such techniques are not necessary. A system operator could simply assign some arbitrary value based upon his or her own judgment reflecting a trade off between signal strength (call quality) and predetermined priority for selected system providers. If the RSSI of the selected SID is within the predetermined limits at step 509, the process moves to point A for the option to undergo sub-routine 505 as illustrated in FIG. 6. As previously stated, this sub-routine can be bypassed at the discretion of the system operator. If the selected SID remains unchanged after point A, carrier acquisition of a control frequency for the selected SID is conducted at step 506 as previously described.

If the RSSI of the selected SID is not within the predetermined limits used at step 509, the process moves to step 510 for the selection of an alternate SID. As indicated in FIG. 5, the alternate SID is selected and the routine moves to point A, and from there to the acquisition of an appropriate carrier frequency. The selection of the alternate SID can be based upon the received SID on the preferred SID list having the highest RSSI. An alternate routine is also possible as indicated by alternate 511 on FIG. 5. In this alternate, the alternate SID is based upon a level of priority of a received SID as determined by the priority of the SIDs on the preferred list stored in the subscriber unit CMR. Taking this alternative, a determination is made at step 508 if the new (alternate) SID has the highest RSSI (of all received SIDs found in the preferred SID list). The process of steps 508,509 and 510 is repeated as before.

FIG. 6 is a flow chart depicting an optional sub-routine that can be carried out at point A of the FIG. 5 flow chart. Instead of carrying out the sub-routine, the SID selected in the flow chart of FIG. 5 can be the SID with which the roaming subscriber unit registers by acquiring a control carrier at step 506. However, there may be circumstances under which there is a wide disparity between the RSSI of received SIDs found on the preferred SID list and the RSSI of received SIDs not found on the preferred list. Consequently, some balancing must be done between the desire to use a preferred service provider and the necessity of ensuring high quality communication. This balancing has already been partially addressed by some of the steps in the flow diagram of FIG. 5. However, this is limited to a comparison of the RSSI of those received SIDs found on the preferred SID list. Other received SIDs may have much higher signal strength readings, making them better candidates for completion of a call even though the available rates are not as low as those from service providers on the preferred SID list.

At step 601, the RSSI of the selected SID is compared with that of all the other received SIDs to determine if the RSSI of the selected SID is the highest. If this is the case, then the control carrier of the service provider associated with the selected SID is acquired by the subscriber unit and registration carried out. If, on the other hand, the selected SID does not have the highest RSSI of all of the received SIDs available to the subscriber terminal, a comparison will be made at step 602 between the RSSI of the selected SID and that of the available SID having the highest RSSI value. This step can be conducted in the same manner as done at step 509 in FIG. 5. The selection of a "window" or a "threshold" depends upon the system operator's balancing of the desire for a higher priority service provider and the need for the highest quality communication. If the selected SID is within the tolerance ranges dictated for the step at 602, then the control frequency carrier of the system provider corresponding to the selected SID is acquired and registration carried out.

If, on the other hand, the RSSI of the selected SID is not within the limits set at step 602, an alternate SID must be selected as indicated at step 603. Based upon the process carried out in FIG. 5, the selected SID is assumed to be that having the highest RSSI of all of the received SIDs on the preferred SID list stored in the subscriber unit. Consequently, the only alternatives available for superior call quality will be received SIDs not found on the preferred SID list stored in the subscriber unit. Since there is no priority among the received SIDs not on the preferred SID list, the SID having the highest RSSI will be selected to ensure the highest call quality. Consequently, at this point, the selection of an alternate SID will be limited to a single choice.

It is noted that with the proper selection in criteria applied at step 502 in FIG. 5, steps 509 and the entire sub-routine of FIG. 6 can be eliminated. This would require that only those signals that have a sufficiently high RSSI for high quality communication will be considered, thereby obviating additional checks of RSSI for a selected SID. It is further noted that the use of steps 509 and 602 for additional RSSI comparison is necessitated only when there are a plurality of acceptable SIDs found on each of the frequency bands. Normally this is not the case in the A and B bands. The C band which is expected to be dedicated to PCS use, on the other hand, will provide a plurality of SIDs so that at least two SIDs will be selected and stored (at step 502) for the PCS band. It is further noted that there may be more than one PCS band, and each of these bands will provide at least two SIDs to be selected and stored at step 502. As previously stated, if the threshold parameters at step 502 are set high enough, even the PCS bands will normally not provide more than one candidate SID for selection and storage. Such threshold parameters are adjustable based upon the traffic, band allocation and other parameters known to the system operators and designers. The thresholds throughout the entire process depicted in FIGS. 5 and 6 are variable, and as previously stated, can actually be used to eliminate some of the steps as being redundant. The key to the operation of the present invention is the use of at least one signal from each of the bands for selection and storage, and later comparison to the preferred SID list.

While registration of a roaming subscriber unit is normally limited to the selection and storing of a single SID from each of the available bands during registration (except at the boundary between service providers), this is not the case for hand-off occurring at the boundary between cell site base stations. Because of this interface, there will be more than one strong signal on each of the bands. Consequently, it is necessary for the system to select and store the two strongest signals from each of the available bands.

The process depicted in flow charts of FIGS. 5 and 6 can be used to bias hand-off from a preferred service provider to a non-preferred service provider. Such biasing would take place at step 506 (FIG. 5). This biasing would inhibit hand-off from a weakening preferred service provider to a non-preferred service provider having a much stronger signal. As previously stated, the ratio between the two signals could be the key factor for determining when the delayed hand-off should finally take place. Thus, a modified version of FIG. 5 could be employed as part of the overall hand-off sequence. The SIDs available for hand-off would be selected and stored. The received SIDs would be compared to the stored preferred SID list to determine if a preferred SID was available for hand-off. A preferred SID could be selected based upon signal strength or priority of the stored SID list. A final comparison of the RSSI of the selected SID could be made to that of the strongest available SID. In this step, the biasing factor could be applied balancing the desire to use a preferred SID against the necessity for high quality signal characteristics. Based upon this last evaluation, either the selected preferred SID can be used as a hand-off target, or the strongest non-preferred SID can be used. In the latter case, hand-off from a preferred SID to a non-preferred SID can be delayed based upon differences in signal strength or any other factor that could be derived through normal statistical analysis. Such a statistical analysis is not necessary since the factor could be based solely on the judgment of the system operator.

It is significant to note that the present invention can be used to accommodate virtually any contractual arrangement between service providers, encompassing a wide range of system provider status and priority. These priorities can be balanced against measured signal parameters based upon virtually any criteria selected by the system operator. The purpose of any biasing done in this balancing between the two factors is done with the purpose of maintaining acceptable communication quality while keeping the price to the subscriber as low as possible.

It is noted that the operation of selecting the most appropriate available service provider based upon the pre-stored preferred SID list can be manually negated. This is most easily done through keypad 45 (FIG. 4). However, the manual override control is not limited to the depicted keypad. Rather, any control device occurs to one skilled in this art can be used with a handset modified in accordance with the present invention.

It will be readily seen by one of ordinary skill in the art that the present invention fulfills all of the objects set forth above. After reading the foregoing specification, one ordinary skill will be able to effect various changes, substitutes of equivalence and various other aspects of the invention as broadly disclosed herein.

Although a number of arrangements of the present invention have been mentioned by way of example, it is not intended that the invention be limited thereto. For example, the present invention can be adapted so that the preferred SID list is not necessarily placed in the subscriber unit or handset at the factory. Rather, it may be possible to download current preferred SID lists using various modes of radio frequency communication. It is therefore intended that the protection granted hereon be limited only by the definition contained in the appended claims and equivalents thereof. Accordingly, this invention should be considered to include any and all configurations, modifications, variations, combinations or equivalent arrangements falling within the scope of the appended claims.

We claim:

1. A radio telephone subscriber unit arranged for use in a communication system having a plurality of frequencies divided into a plurality of available frequency bands, said radio telephone subscriber unit including a controller, said controller comprising:

(a) means for scanning the radio frequencies in all available frequency bands;

(b) means for recording at least one received system identification number (SID) associated with each of said available frequency bands;

(c) means for comparing said received SIDs for each said available frequency band to a prioritized list of preferred SIDs stored in said radio telephone subscriber unit;

(d) means for selecting a single received SID based upon said prioritization of said list of preferred SIDs stored in said radio telephone subscriber unit so that a received SID with a highest prioritization is selected; and (e) means for acquiring a radio frequency carrier corresponding to said selected single received SID.

2. The radio telephone subscriber unit of claim 1, wherein said controller further comprises means for scanning for a home SID corresponding to a home service provider for said radio telephone subscriber unit.

3. The radio telephone subscriber unit of claim 2, wherein said controller further comprises means for initiating scanning of all said radio frequencies when said home SID is not received.

4. The radio telephone subscriber unit of claim 3, further comprising a roaming light activated when said home SID is not received by said radio telephone subscriber unit.

5. The radio telephone subscriber unit of claim 4, further comprising an alphanumeric display.

6. The radio telephone subscriber unit of claim 3, wherein said controller further comprises means for deactivating said means for comparing and said means for selecting whereby said radio telephone subscriber unit selects a strongest received signal regardless of an associated SID.

7. The radio telephone subscriber unit of claim 1, further comprising means for manually entering data into said list of predetermined SIDs into a memory contained within said radio telephone subscriber unit.

8. The radio telephone subscriber unit of claim 7, wherein said means for manually entering comprise a keyboard.

9. The radio telephone subscriber unit of claim 1, wherein said means for selecting further comprise second means for comparing strength of received signals to a predetermined range of signal strength.

10. The radio telephone subscriber unit of claim 1, wherein said means for scanning comprise means for comparing Receive Signal Strength Indication (RSSI) of received SIDs to a predetermined threshold indicative of a desired signal level.

11. The radio telephone subscriber unit of claim 10, wherein said means for recording records at least two SIDs associated with any frequency band dedicated to Personal Communication System (PCS).

12. The radio telephone subscriber unit of claim 10, wherein said means for recording records at least two SIDs for each of said frequency bands, said recorded SIDs having the highest RSSI for each of said frequency bands.

13. The radio telephone subscriber unit of claim 12, wherein said means for comparing comprise means for prioritizing said received SIDs based upon said list of preferred SIDs stored in said radio telephone subscriber unit.

14. The radio telephone subscriber unit of claim 12, wherein said means for selecting comprise second means for comparing at least a signal quality of said single received SID with a predetermined threshold based upon other received SID signal characteristics found on said list of preferred SIDs stored in said radio telephone subscriber unit.

15. The radio telephone subscriber unit of claim 14, wherein said means for selecting further comprise third means for comparing a signal quality of said selected received SID to a second threshold value determined by signal values of all said received SIDs.

16. A method of selecting a system provider for a radio telephone communication on at least one of a plurality of radio frequency bands by a radio telephone subscriber unit, said method comprising the steps of:

(a) scanning each of said available radio frequency bands;

(b) recording at least one received system identification number (SID) associated with each of said radio frequency bands;

(c) comparing said received SIDs for each said available radio frequency band to a prioritized list of preferred SIDs stored in said radio telephone subscriber unit;

(d) selecting a single received SID based upon said prioritization of said list of preferred SIDs stored in said radio telephone subscriber unit so that received SID with a highest prioritization is selected; and (e) acquiring a radio frequency carrier corresponding to a control channel of said selected single received SID.

17. The method of claim 16, wherein step (a) includes the sub-step of determining if a home SID is available to said radio telephone subscriber unit.

18. The method of claim 16, wherein step (a) further comprises the sub-step of activating a roaming light when said home SID is not available to said radio telephone subscriber unit.

19. The method of claim 18, wherein two SIDs are recorded for each frequency band dedicated to Personal Communication System (PCS) use.

20. The method of claim 1, wherein said at least one received SID associated with each said available frequency band has the highest Received Signal Strength Indication (RSSI) for each respective available frequency band.

21. The method of claim 19, wherein said two received SIDs for each said available frequency band dedicated to PCS use has one of two highest RSSI(s) received by said radio telephone subscriber unit for each respective available frequency band dedicated to PCS use.

22. The method of claim 18, wherein step (d) comprises the sub-steps of:

(i) comparing received signal strength (RSSI) of available SIDs found on said list of preferred SIDs to establish a difference in signal strength; and (ii) comparing said difference in RSSI to a predetermined threshold.

23. The method of claim 22, further comprising the sub-step of:

(iii) altering said difference in RSSI according to a priority established on said list of preferred SIDs stored in said radio telephone subscriber unit.

24. The method of claim 23, further comprising the sub-step of:

(iv) comparing an RSSI of an available SID on said preferred SID list to an RSSI of a SID not on said preferred SID list to determine a second difference in said RSSI; and (v) comparing said second difference in RSSI to a second predetermined threshold.

25. The method of claim 24, further comprising the sub-step of:

(vi) altering said second difference in RSSI according to a priority established on said list of preferred SIDs.

26. A registration system for a radio telephone communication system servicing a plurality of radio telephone subscriber units arranged for communication with a plurality of cell sites over a plurality of radio frequencies divided into frequency bands, said registration system comprising:

(a) means for generating a System Identification Number (SID) associated with each radio telephone service provider in said radio telephone system;

(b) means in each of said radio telephone subscriber units for scanning the radio frequencies in all available frequency bands in said radio telephone communication system;

(c) means in each of said radio telephone subscriber units for recording at least one SID associated with each of said available frequency bands;

(d) means for selecting a single received SID based upon a comparison of received SIDs with a prioritized list of preferred SIDs stored in said radio telephone subscriber units so that a received SID having a highest priority is selected; and (e) means for carrying out a communication function based upon said selected single received SID.

27. The system of claim 26 further comprising means for pre-programming each said subscriber unit.

28. The system of claim 27 further, wherein said means for pre-programming comprise means for entering a list of preferred SIDs.

29. The system of claim 28 further comprising means for prioritizing said SIDs on said preferred SID list stored in each subscriber unit.

30. The system of claim 26, wherein each said subscriber unit further comprises means for comparing said received SIDs for each said available frequency band to said list of preferred SIDs stored in each said radio telephone subscriber unit.

31. The system of claim 26, wherein said means for generating and transmitting said SIDs comprise cellular telephone base stations.

32. The system of claim 30, further comprising means for biasing a comparison Received in Signal Strength Indication (RSSI) based upon a priority found in said list of preferred SIDs.

33. The system of claim 32, wherein said comparison in RSSI is between a selected SID from said preferred SID list and a received SID having a highest RSSI of all SIDs on said preferred SID list.

34. The system of claim 26, wherein said means for carrying out a communication function comprises means for acquiring a radio frequency carrier corresponding to said selected single received SID.

35. The system of claim 26, wherein each said telephone subscriber unit comprises means for scanning for a home SID corresponding to a respective home service provider for each said radio telephone subscriber unit.

36. The system of claim 35 for each said radio telephone subscriber unit comprises means for initiating scanning of all said radio frequencies when said home SID is not received.

37. The system of claim 26, wherein said means for scanning comprise means for recognizing a highest RSSI in each said available frequency bands.

* * * * *